United States Patent [19]
Drapeau

[11] Patent Number: 5,828,410
[45] Date of Patent: Oct. 27, 1998

[54] VIDEO-WALL VIEWING-ANGLE ENHANCEMENT SYSTEM

[76] Inventor: Raoul E. Drapeau, 2410 Luckett Ave., Vienna, Va. 22180

[21] Appl. No.: 504,284

[22] Filed: Jul. 19, 1995

[51] Int. Cl.[6] ............................... H04N 5/66; H04N 9/12
[52] U.S. Cl. ..................... 348/383; 348/383; 348/36; 348/359; 348/839; 348/840; 359/450
[58] Field of Search ............................ 348/383, 36, 359, 348/839, 840; 359/450; H04N 5/66, 9/12

[56] References Cited

U.S. PATENT DOCUMENTS

| | | | |
|---|---|---|---|
| 3,909,525 | 9/1975 | Fagan | 178/7.85 |
| 4,631,584 | 12/1986 | Reitmeier | 358/141 |
| 4,695,135 | 9/1987 | Blokland et al. | 350/452 |
| 4,734,779 | 3/1988 | Levis et al. | 358/231 |
| 4,866,530 | 9/1989 | Kalua | 358/250 |
| 4,924,318 | 5/1990 | Ho | 358/250 |
| 5,011,277 | 4/1991 | Ogino et al. | 353/94 |
| 5,067,021 | 11/1991 | Brody | 358/241 |
| 5,299,017 | 3/1994 | Furuno | 348/786 |
| 5,300,942 | 4/1994 | Dolgoff | 348/749 |

*Primary Examiner*—John K. Peng
*Assistant Examiner*—Vivek Srivastava

[57] ABSTRACT

A system for increasing the useful viewing angle in an array of video display units, also called a video wall, comprising the duplication of an outer marginal strip of the displayed image on adjacent video display units, a cylindrical lens structure mounted over the frame of each video display units and outer strip, with a spatial compression of a portion of outer strip, or the duplication of the image in an outer marginal strip of the displayed image in adjacent video display units, and a spherical lens placed over the entire viewing surface and frame of each video display unit. With proper selection of lens parameters and aforementioned image modifications, the invention produces a magnified image that obscures the image of the frame between adjacent video display units and gives the effect of a single large display over an increased viewing angle.

4 Claims, 2 Drawing Sheets

VIDEO-WALL VIEWING-ANGLE ENHANCEMENT SYSTEM

REFERENCES CITED (U.S. patents)

U.S. Pat. No. 3,909,525 September/1975 Fagan 178/7.85

U.S. Pat. No. 4,695,135 September/1987 Den Exter Blokland et al 350/452

U.S. Pat. No. 4,734,779 March/1988 Levis et al 358/231

U.S. Pat. No. 4,866,530 September/1988 Kalua 358/237

U.S. Pat. No. 4,924,318 May/1990 Ho 358/250

U.S. Pat. No. 5,011,277 April/1992 Ogino et al 353/94

FIELD OF THE INVENTION

This invention relates to the field of video displays, and particularly to those display systems called "video walls", comprised of a number of individual video display units.

BACKGROUND OF THE INVENTION

Because of the difficulty and expense of making a bright, large-area display for the presentation of still or moving images using a single video display unit, the concept of video wall systems was developed. A video wall consists of a plurality of individual video display units, usually standard television monitors, either of the direct-view or projection type, that are placed with their viewing screens adjacent to each other in a two-dimensional array.

In addition to the physical conjunction of such video display units, there can also be the inclusion of electronics that will divide up a single video image into as many sections as there are individual video display units in the video wall system, and then distribute those image sections to each video display unit of the wall, while maintaining their original respective positions. This technology is described in Levis et al (U.S. Pat. No. 4,734,779) and available commercially as multi-screen controllers from such firms as RGB Spectrum, Iden and Electrosonic. Thus, the viewer sees the effect of a much larger version of that single image than can be presented on a single video display unit, yet the composite display has a greater brightness and contrast than is usually possible from a single projection video display of the same size.

The difficulty with this approach of dividing a single image into sections for display on individual video display units is that the individual display screens do not meet perfectly at their outer edges. There is an unavoidable gap devoid of image between adjacent screens due to the supporting mechanical structure and bezel, the combination hereinafter referred to as the frame, as well as the inability of the picture in some video display units to extend to the very edges of the screen. This practical reality detracts from the intended effect of these combined video display systems. To maximize the effect of a single large screen, the video display units are usually chosen to have the minimum possible frame around the margin of each such video display unit.

It is possible to obscure this frame from the viewed image by using laterally-abutted plano-convex magnifying or projection lenses covering the display surface of each video display unit such as described in Kalua (U.S. Pat. No. 4,866,530), DenExter Blokland (U.S. Pat. No. 4,695,135) and Fagan (U.S. Pat. No. 3,909,525). Such lenses are adapted to magnify the image of each individual video display unit, so that the magnified image covers and hence masks the frame, thereby producing a unified image. However, arrays of such large lenses are bulky, heavy and costly, even when the lenses are made of plastic, or are of the relatively-thin Fresnel type.

In addition to these disadvantages, this approach of enlarging the entire picture produces the desired frame-elimination effect only when the observer is on or close to the imaginary plane that lies between each of two adjacent video display units and is perpendicular to their display surfaces; that is, for small viewing angles. This plane is hereinafter referred to as the separating plane. The angle subtended at the point where the separating plane meets the viewing surfaces of two adjacent video display units and measured between the separating plane and the viewer, is hereinafter referred to as the viewing angle. As the aforementioned viewing angle increases, the frame begins to become visible, thereby destroying the desired effect. Prior art has not addressed this problem effectively.

Until the current invention, there was no practical, cost-effective means available of obscuring the video display unit frames in a video wall system over a useful viewing angle.

OBJECT OF THE INVENTION

The object of the current invention is to provide a unique and cost-effective means of obscuring the frame between adjacent video display units of a video wall system over an increased viewing angle, before the frame is again visible in the viewed image.

SUMMARY OF THE INVENTION

To this end, one implementation of this unique system consists of a uni-directional magnifying structure that has a magnifying axis and a non-magnifying, or longitudinal axis, hereinafter referred to as a cylindrical lens. This lens is placed over both the frame and a portion of the displayed image of each video display unit of the array, with the longitudinal, or non-magnifying axis of the lens oriented parallel to the video display unit frame. The aforementioned portion of the displayed image lies nearest to where the video display unit viewing surface meets each inside edge of the frame, and is hereinafter referred to as a marginal strip.

To offset the effect of only a portion of the displayed image being magnified by the aforementioned cylindrical lens, the video display unit electronics can be modified to spatially-compress the marginal strip of the image in the direction perpendicular to the long axis of the cylindrical lens, with said marginal strip further lying directly under the aforementioned cylindrical lens. The combination of said unidirectional compression of a marginal strip of the image, with the collinear unidirectional magnification of the same strip, produces an unmodified image that covers the frame and forms a unified image with the portion of the image not lying under the cylindrical lens.

To obscure the frame from the viewed image, it is not required to employ the aforementioned unidirectional image compression at the edge of the viewing surface; however in its absence, the image in the expanded area covering the frame may appear different from that in the remainder of the display.

In this arrangement using a cylindrical lens, with or without spatial compression, the frame will become visible even for very small viewing angles. To obscure the frame for a much greater viewing angle, the video display unit electronics can be further modified to produce a marginal strip of the image on a video display unit that is duplicated in the corresponding position on the adjacent video display unit, said duplicated portions also lying under their respective cylindrical lenses.

The aforementioned cylindrical lens, in combination with the compressed portion of the displayed image and the duplicated portion of the displayed image on adjacent video display units, produces a magnified image that, by proper selection of lens magnification and dimensions can give the effect of a single large display, whose frame is obscured from view over a much wider range of viewing angles than is possible in previous art.

A number of lens configurations will produce the desired effect, but one can be formed starting with an asymmetrical plano-convex cylindrical lens of sufficient length to cover one side of the frame of a video display unit of the video wall. The lens asymmetry results from the two longitudinal edges having different thicknesses. This asymmetrical nature of the lens can be achieved by molding the lens in the desired shape at the outset, or by separating a symmetrical cylindrical lens longitudinally into two identical segments, such as by scoring and breaking.

For the purposes of this invention, the best effect is produced when the flat, or piano, side of each such lens segment is placed next to the display screen surface, and its thin, or edge having greatest refraction, also hereinafter referred to as the second edge, is closest to the adjacent video display. The thicker, or least refracting edge is hereinafter referred to as the first edge.

One physical appearance of a lens structure fabricated from such cylindrical lens segments would be a mitred set of four such segments, mounted above each video display unit of the video wall, and covering both the video display unit's frame and the aforementioned marginal strip of the displayed image. The appearance of the lens structure would be similar to that of a picture frame, with the thinner edge of the lens structure lying along the outside of the lens structure.

Another configuration of greater cost, but simpler to mount to the video display unit structure, would be to construct the required lens structure from a single sheet of clear flat material of sufficient area to completely cover each video display unit of the array, including its frame, the outer portion of which sheet being molded or cut into the cylindrical magnifying shape described. Alternatively, and this is the technique described in the preferred embodiment, a clear, flat sheet of somewhat smaller area could be used, to the outside edges of which, cylindrical lens segments of the kind described were attached.

Because a cylindrical lens structure of the kind described made of solid glass or plastic will add an undesirable element of weight and thickness to the video wall structure, a Fresnel lens can be used instead. In that case, the lens consists of very small lens segments molded or cut into clear plastic. The overall thickness of such a lens is nearly uniform across its surface, and its weight can be considerably less than that of a solid lens. The reduced thickness also conveys a benefit in reduced distortion of the perceived image at the thick edge of a solid lens.

A further implementation would employ a series of laterally-abutted uniform spherical magnifying lenses, each of sufficient size to cover the entire screen of each of the video display units of the array, including the frame, such lenses used in conjunction with the aforementioned duplication of a marginal strip of the image.

However constructed, cylindrical lens assemblies are then attached to the frame of each video display unit, and suitably raised above the video display unit screen to provide the needed magnification. Although not part of the current invention, those skilled in the art can appreciate that the aforementioned lens structures can be held in place by partition plates attached to the outer edges of the video display unit frame, since that portion of the overall structure is, by the very purpose of the invention, not visible; such plates used in combination with small clips that grip and hold the lens structure in place to those plates, or the like.

Although the required electronics modifications are not claimed in this invention, persons skilled in the art will know that the unidirectional, spatially-compressed marginal strip and their duplication on adjacent video display units can be produced in several ways.

One means to accomplish such unidirectional spatial compression of a marginal strip of the displayed image is to suitably modify the digital image processing circuits that are commonly used to separate a single video image into sections that are then allocated to each video display unit of the array. This modification could include using a pixel replication algorithm that produces a different spatial density for pixels near either end of both horizontal and vertical scans than in the center of the image.

An alternative means to achieve such unidirectional spatial compression of a marginal strip of the displayed image is to modify the scan rate in both the beginning and ending portions of both the horizontal and vertical analog deflection electronics.

By adaptation of the video memory circuits, the same digital image processing systems can be further modified to produce a duplication of a marginal strip of a video display unit with that of the adjacent video display unit.

BRIEF DESCRIPTION OF THE DRAWINGS

An embodiment of the invention is described in more detail with reference to the accompanying drawings, wherein.

It will be recognized that some or all of the preceding Figures do not necessarily show all the elements required to construct the depicted preferred embodiment, or accurately reflect their relative sizes or positions.

DETAILED DESCRIPTION OF THE INVENTION

Figure 1:
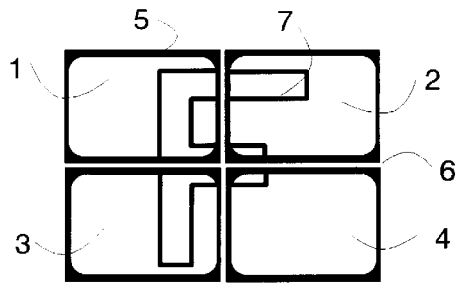
FIG. 1 is a front view of a typical video wall display system displaying a single image, portions of which are distributed to each of a plurality of video display units.

FIG. 1 is a frontal view of a video wall system consisting of four separate video display units, 1–4, organized into two rows of two video display units each. Each such video display has a bezel or frame 5 around all four of its sides, as indicated for video display unit 1. In addition, there is a joint 6, between adjacent video display units, from which the aforementioned imaginary separating plane emerges. Each video display unit can carry a complete, individual image, or display a segment of a single image, 7.

Figure 2:
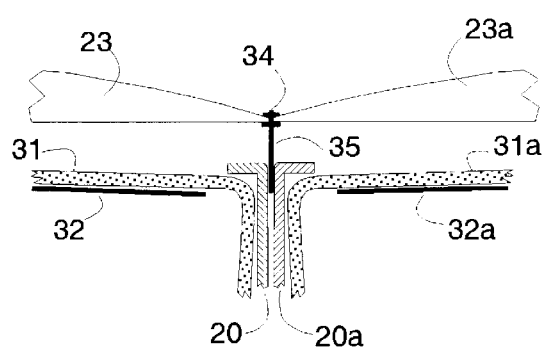
FIG. 2 is a cross-sectional view of a portion of the viewing surface of two adjacent video display units, each of which is covered by a spherical lens.

FIG. 2 is a cross-sectional view of a portion of the viewing screen near the frame 20 and 20a of two adjacent video display units of an array of such video display units such as shown in FIG. 1. In the descriptions and Figures to follow, the video display units referred to may be of either the direct-view CRT type, or of the projection type, and still satisfy the purposes of the current invention. The entire frontal area of each such video display unit screen, including its frame, is covered by a plano-convex, spherical-surfaced magnifying lens, hereinafter referred to as a spherical lens, a portion of which is shown as 23 and 23a, said lenses producing equal magnification in both height and width of the underlying image.

The portion of the lenses closest to their respective video display unit frames are indicated as 23 and 23a, the faceplate of the video display units as 31 and 31a, and the actual effective viewing surface, the outer edges of which are shown, as 32 and 32a. The gap between mechanical supporting structure and frame 20 and 20a for the video display units, also can provide a means for the mounting of the lenses 23 and 23a by means of a suitable thin plate 35 with integral supporting shelf and retention clip, 34. As described in Ho (U.S. Pat. No. 4,924,318) and Kalua (U.S. Pat. No. 4,866,530), this vertical portion of said plate can be opaque to prevent interference between adjacent video display units. Further, the clip, or retention portion 34, directly above and below the outermost edges of the lenses can be transparent to avoid blocking the image.

Figure 3:
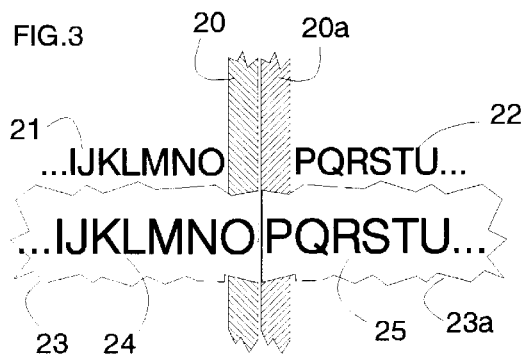
FIG. 3 is a top view of the same lens and video display unit arrangement of FIG. 2.

FIG. 3 is a top view of the same lens and video display unit arrangement of FIG. 2. The effect of this arrangement is to produce a perceived image in which the frames 20 and 20a are obscured when viewed on the imaginary separating plane between two adjacent video display units. Any observer positioned to either side of said separating plane will begin to observe through the lens, portions of the frames 20 or 20a. It is this deleterious effect that the additional modifications that are the subject of this invention, address.

For comparison, in this and the following drawings, the displayed image on each video display unit will be assumed to be two lines of text. One line of text on each video display screen will be shown as unaffected by the lens structure, and the second as subject to the effect of the lens. Thus, lines 21 and 22 are as they appear on their respective video display screens, and 24 and 25 are as they appear to the viewer through the respective lens structures 23 and 23a. Notice that both height and width of the characters have been equally magnified by the spherical lens.

Figure 4:
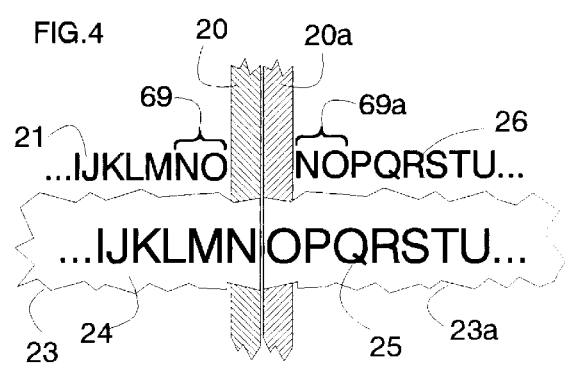
FIG. 4 depicts the viewing surfaces of FIG. 3, with a duplicated marginal strip on two adjacent video display units.

FIG. 4 is a top view of the same spherical lens, lens support and video display units shown in FIG. 3, where in addition, the outermost portion of the image 69 and 69a of both displayed lines 21 and 22 has been duplicated on each adjacent video display unit. Further, the lens and support structures have been repositioned to produce a somewhat greater magnification so that half the width of the duplicated portion 69 and 69a is visible on one side of the line separating the two adjacent video display units, and half on the other side, resulting in magnified line fragments 24 and 25. As in FIG. 3, the frames 20 and 20a are obscured in the viewed image.

Figure 5:
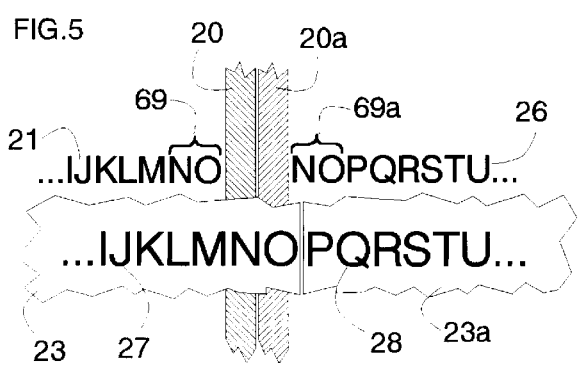
FIG. 5 depicts the viewing surfaces of FIG. 4, showing the effect of an off-axis viewing position.

FIG. 5 is a top view of the same lens and video display unit arrangement of FIG. 4, showing the effect of a shift of the lens structure to the right of the imaginary separating plane between the two adjacent video display units, or equivalently, an unshifted lens structure, but with an off-axis viewing position to the left of the separating plane. This shift in structure or viewing position is shown with the farthest point of the duplicated portion of image visible, resulting in magnified line fragments 27 and 28, and thereby affording a noticeably increased viewing angle before the image of the frame becomes visible. This same viewing angle and effect can be achieved by shifting the observer's point of view in the opposite direction.

Figure 6:
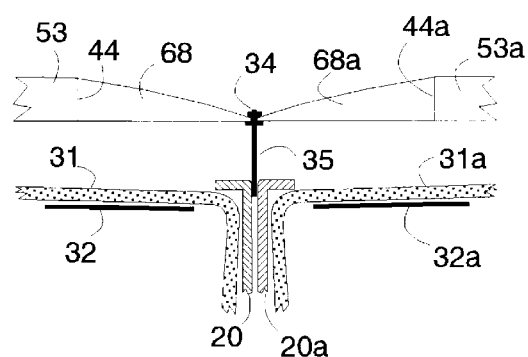
FIG. 6 is a cross-sectional view of a portion of the viewing surfaces of two adjacent video display units, each of which is covered by a cylindrical lens structure.

FIG. 6 is a cross-sectional view of a portion of the viewing surface near the frames of the same two video display units of FIG. 3, wherein a marginal strip of the viewing surface of each of such video display unit is covered by a segment of a plano-convex cylindrical magnifying lens 68 and 68a, whose longitudinal, or non-magnifying axis is parallel to the viewing surface, and whose edge of greatest refraction is closest to its respective video display unit's frame. For reasons of support, the cylindrical lens segment is here shown adjoined to a clear, flat supporting sheet 53 and 53a along the surface 44 and 44a.

The video display unit elements 31, 31a, 32, 32a, 20 and 20a, and lens support elements 34 and 35 are all as described in FIG. 2. It will be apparent that the position of the lens structure above the video display screen, or the magnification of the lens used in FIG. 6 may be different from that used in FIG. 2, since in FIG. 2, the entire width of the video display screen is magnified to produce the effect of covering the frames 20 and 20a, whereas in FIG. 6, a smaller portion of the displayed lines of text must be magnified a larger amount to cover the same frame.

Figure 7:
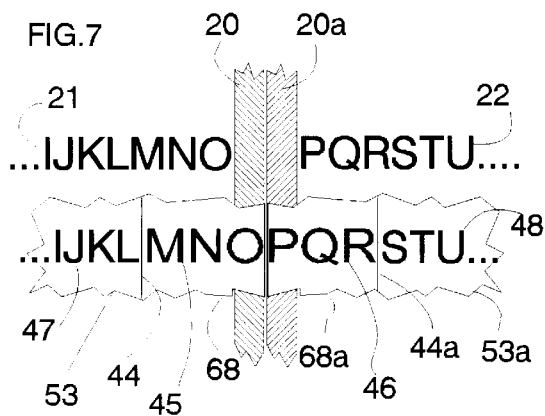
FIG. 7 is a top view of the same lens and video display unit arrangement of FIG. 6.

FIG. 7 is a top view of the same lens and video display unit arrangement of FIG. 6. The cylindrical magnifying lenses are again indicated as 68 and 68a, the flat supporting sheets as 53 and 53a, and the surfaces joining said lenses to said support sheets as 44 and 44a. In this configuration however, the marginal strip under the cylindrical lenses 68 and 68a, is magnified only in the direction orthogonal to the lens' longitudinal axis, such that the resulting magnified image covers the frame.

Figure 8:
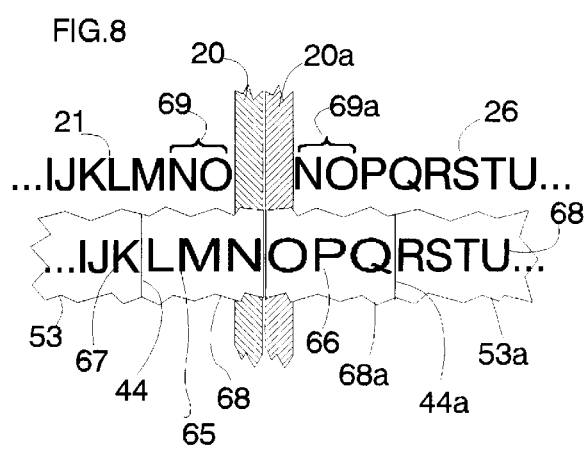
FIG. 8 depicts the viewing surfaces of FIG. 7, with a duplicated marginal strip on two adjacent video display units.

FIG. 8 is a top view of the same cylindrical lens, lens support and video display unit arrangement of FIG. 7, where in addition, a marginal strip of the image 69 and 69a of the displayed lines 21 and 22 has been duplicated on the adjacent video display unit. Further, the lens and support structures have been repositioned to afford a somewhat greater magnification so that half the width of the duplicated portion 69 and 69a is visible on one side of the imaginary separating plane, and half on the other side, resulting in magnified line fragments 65 and 66 adjacent to unmagnified fragments 67 and 68.

Figure 9:
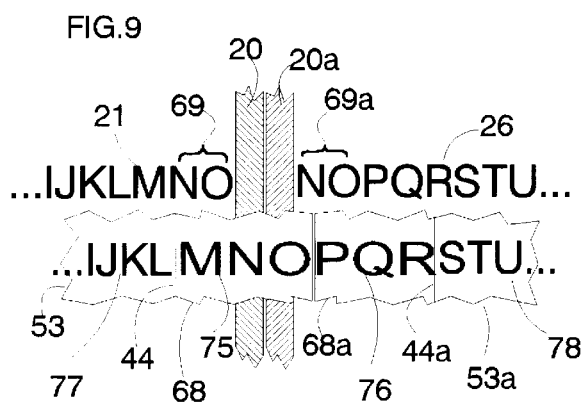
FIG. 9 depicts the viewing surfaces of FIG. 8, showing the effect of an off-axis viewing position.

FIG. 9 is a top view of the same lens and video display unit arrangement of FIG. 8, showing the effect of a shift of the lens structure to the right of the imaginary separating plane, or equivalently, an unshifted lens structure, but with an off-axis viewing position to the left of the separating plane. An observer can then move in the direction shown until the farthest point of the duplicated marginal strip is reached, resulting in magnified line fragments 75 and 76 adjacent to unmagnified segments 77 and 78, and thereby affording a noticeably increased viewing angle before the image of the frame becomes visible. This same viewing angle and effect can be attained by shifting the observer's point of view in the other direction.

Figure 10:
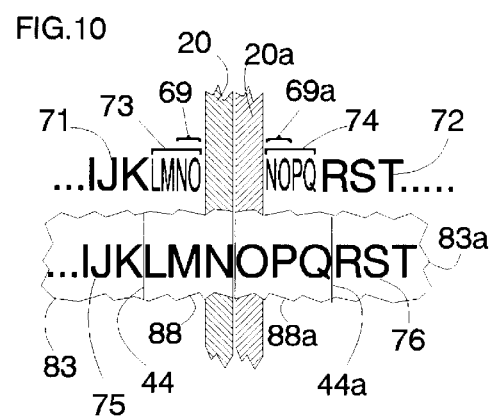
FIG. 10 depicts the viewing surfaces of FIG. 8, with the outermost portion of both displayed images spatially compressed.

FIG. 10 is a top view of the same lens and video display unit arrangement of FIG. 8, wherein a marginal strip 73 and 74 of both displayed images lying under the cylindrical lenses 88 and 88a and adjoined to clear flat sheet 83 and 83a, is spatially compressed in the direction orthogonal to the lens' longitudinal axis, and contains marginal strips 69 and 69a. The effect of this arrangement in combination with the magnification afforded by the overlying cylindrical lenses, is to restore the relative size of the magnified image, so that the frames 20 and 20a are obscured from the viewed image, the resulting image is uniform across the field of view, and the allowed viewing angle before the frame becomes visible is increased. The specific magnification of the cylindrical lenses 88 and 88a that are adjoined to the clear, flat support structures 83 and 83a at the surfaces 44 and 44a, will be different from that used in FIG. 8, since the required magnification may be somewhat greater to achieve the desired visual effect. The cross-section view for the configuration of FIG. 10 has the same general appearance as that of FIG. 6 and is not shown here.

It will also be clear that the smaller the frame 20 and 20a are relative to the spatially-compressed portion of the screen or to the duplicated portion, the greater the viewing angle that the observer can be removed from the separating plane and still have the frame obscured.

Other variants and combinations of the described optical, mounting and electronic video display system elements are possible, especially in the amount of magnification required, the magnitude and extent of the displayed object spatial compression, the amount of image repetition used, the lens parameters employed, the means by which the lens segments are fabricated and mounted, and the type of video display unit employed; direct-view or projection, all without departing from the scope of the invention.

What I claim is:

1. A system for obscuring an image of a frame between display surfaces of adjacent video display units of a multi-unit display system and increasing the useful viewing angle, comprising:

magnifying means consisting of for each video display unit, a cylindrical surface lens overlying the marginal portion of said video display unit, each said lens having first and second edges;

said first edge of each said cylindrical lens having least refraction, and said second edge of each said cylindrical lens having greatest refraction;

said lenses being placed with each first edge thereof above an inner edge of a marginal strip of a viewing surface of a respective display surface of a respective video display unit with said first edge facing toward a center of said respective display surface;

said lenses being respectively placed with each second edge thereof parallel with and directly above an outer edge of a side of said frame adjacent a respective said video display unit;

said lenses being mounted in a raised position above said display system such that a viewer will observe a magnified image of said marginal strip of each video display surface sufficient to obscure said frame; and wherein an outermost portion of an image displayed on one of said video display unit display surfaces and lying entirely under a respective one of said cylindrical lenses is duplicated on an adjacent outermost portion of an adjacent video display unit display surface, said adjacent outermost portion lying entirely under an adjacent cylindrical lens of said adjacent video display unit display surface, said duplication in combination with magnification produced by adjacent cylindrical lenses being sufficient to produce a unified non-duplicative image from adjacent video display units and providing an increase in useful viewing angle.

2. The system of claim 1 wherein a portion of each respective image displayed on a respective one of said video display surfaces and lying under a respective cylindrical lens is spatially compressed in a direction perpendicular to a direction of elongation of an edge of said frame, said compression in combination with magnification produced by said respective cylindrical lens obscuring said frame to observers and producing an image having a same size as an unmagnified portion of said image.

3. The system of claim 1 wherein each said cylindrical lens for each said video display unit is attached at its first edge to a clear, non-magnifying support plate covering the central portion of each said video display unit.

4. The system of claim 1 wherein at least one said cylindrical lens is a Fresnel lens.

* * * * *